Feb. 2, 1971 H. D. ROE 3,560,026
COUPLING ASSEMBLY
Filed April 30, 1969
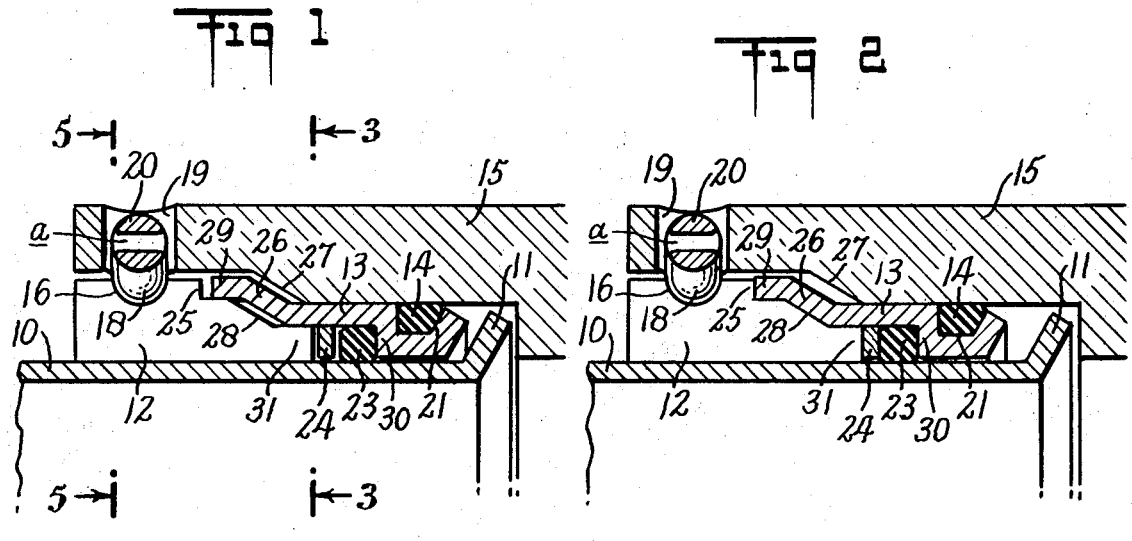
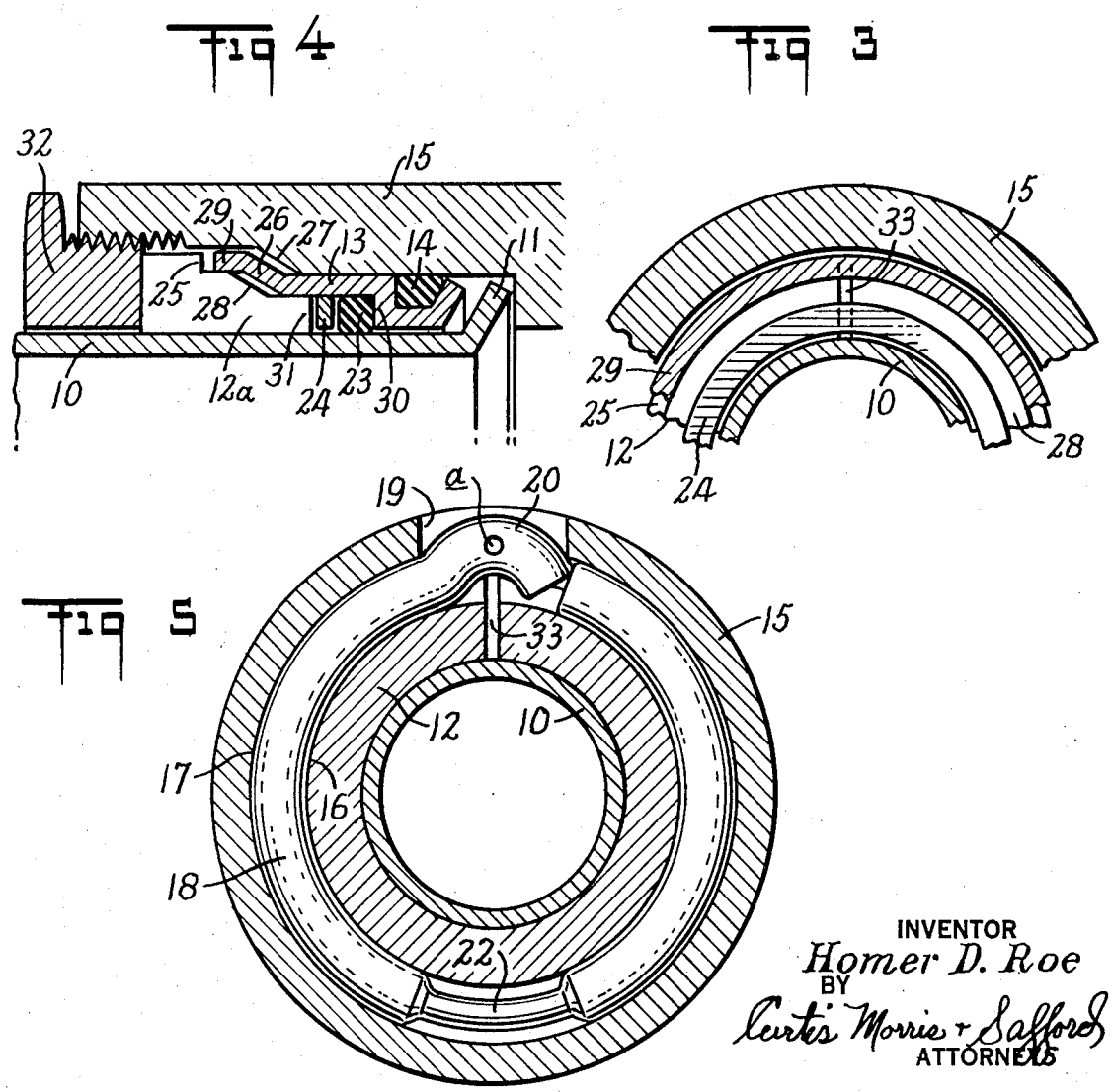
INVENTOR
Homer D. Roe
BY
Curtis, Morris + Safford
ATTORNEYS United States Patent Office 3,560,026
Patented Feb. 2, 1971

3,560,026
COUPLING ASSEMBLY
Homer D. Roe, 8 Chapin Place,
Huntington, N.Y. 11743
Filed Apr. 30, 1969, Ser. No. 820,568
Int. Cl. F16l 17/02
U.S. Cl. 285—105                                    2 Claims

ABSTRACT OF THE DISCLOSURE

A coupling assembly releasably connected to a pipe or tube in a conduit system has a casing which encloses axially outer and inner sleeves, respectively, mounted coaxially on an end portion of the pipe, said outer sleeve to retain the pipe effectively in the assembly and said inner sleeve to retain outer and inner rings in effective sealing contact with the casing and the pipe and said outer sleeve being releasably interlocked with the casing; and a portion of the inner sleeve arranged between the casing and the outer sleeve closely engages the latter to exert constrictive pressure thereon with increasing internal pressure in the system whereby camming action of the inner sleeve constricts said outer sleeve so that the pipe is more securely clamped thereby and restrained against blow-out or outward axial displacement.

An object of the present invention is to provide a coupling assembly capable of being advantageously employed in conduit systems which may carry fluids of widely varying chemical properties, temperatures or pressures, especially systems for conducting chemically active fluids or those involving conditions of extreme heat, cold and/or high pressures. It is advantageous in various installations that the pipes therein be relatively malleable and of minimum weight or gage with adequate tensile and more or less chemically inert; that the coupling elements be such that they can conveniently and economically be assembled or attached on the job or in the shop; that they can readily be dismounted for repair or replacement without impairing the pipe; that they can be made, preformed if desirable, from relatively inexpensive materials; and that, when assembled, they will effectively maintain a secure and leak proof joint without rupture or separation of the coupling parts under severe operating conditions.

SUMMARY OF THE INVENTION

A coupling assembly embodying the invention comprises a pipe having peripheral stop means adjacent its open end, an axially outer and an axially inner sleeve mounted coaxially on said open end portion of the pipe, a casing coaxially enclosing said sleeves and releasably secured to said outer sleeve, and seal rings, one operatively interposed between said inner sleeve and said pipe and one between said inner sleeve and said casing. A portion of the inner sleeve is of truncated conical contour which operatively engages a similarly contoured portion of the outer sleeve, said outer sleeve being longitudinally slotted, or otherwise suitably flexible radially, whereby it may be constricted by internal pressure induced outward axial displacement of the inner sleeve in relation to the outer sleeve and resultant camming thrust of the inner sleeve thereon to more securely grip the pipe and thus impede axially outward displacement of the latter under increasing pressure in the conduit system.

A peripheral shoulder on the outer sleeve provides a stop to limit the extent of outward pressure induced movement of the inner sleeve on the outer sleeve; and the outer sleeve is releasably secured to and operatively positioned in the casing by a flexable locking element disposed in an annular passageway between the outer sleeve and the casing, said locking element having a middle part of reduced cross sectional area positioned in a manner to balance pressure induced forces exerted across said element.

An embodiment of the invention as described and claimed herein is shown in the accompanying drawings wherein:

FIG. 1 is a fragmentary central longitudinal section showing a coupling assembly including an open end portion of a pipe in a fluid conduit system, a portion of a tubular casing enclosing said open end, an inner sleeve, seal rings and an outer sleeve within said casing, and means for releasably interlocking the outer sleeve with the casing, said parts being shown in normal unstressed condition with a tapered or truncated conical longitudinally slotted portion of the inner sleeve embracing a tapered portion of the outer sleeve and with the outer end edge of said inner sleeve spaced from a stop shoulder on the outer sleeve;

FIG. 2 is a fragmentary view of parts seen in FIG. 1 but in stressed condition and showing the outer end of the inner sleeve bearing against the stop shoulder of the outer sleeve to limit constricting effect of the outer sleeve on the pipe;

FIG. 3 is a transverse section on the line 3—3 of FIG. 1;

FIG. 4 is a central longitudinal section showing a modification wherein the coupling parts are retained in operative position by a plug threaded into an open end of the casing; and FIG. 5 is a transverse section on the line 5—5 of FIG. 1, showing a removable flexible element in locking position between the casing and the outer sleeve, said element having an intermediate portion of reduced cross-sectional area.

As seen in FIGS. 1 and 2, a coupling assembly according to the invention includes a pipe 10 having a stop adjacent its open end, as flange 11, or other suitable radially extending deformation, and an outer sleeve 12 mounted on and coaxially embracing and gripping said end portion of pipe 10. An inner sleeve 13 is mounted with its inner end portion arranged coaxially on pipe 10 and an outer end portion embracing the inner end of sleeve 12. An inner seal ring 14 is engaged in a peripheral channel 21 of inner sleeve 13 and thus operatively retained between said sleeve and interior surface portions of a casing 15 which coaxially encloses said pipe end and said sleeves 12 and 13.

As seen in FIGS. 1 and 5, a peripheral annular groove 16 in outer sleeve 12 and opposed annular groove 17 in the interior surface of casing 15 provide a passageway to receive a flexible locking element 18 insertable therein through a slot 19 opening through the wall of said groove 17. Locking element 18 is advantageously bent radially inwardly at one end to provide an elbow 20. The opposite end thereof is readily inserted into and advanced endwise through said passageway; and said ends are brought into and held in operative contact adjacent to slot 19 by presiding said bent end portion at elbow 20 radially inward against the bottom surface of groove 16. A hole *a* in element 18, FIG. 5, permits the use of an appropriate tool for readily removing said element from its operative locking position in the passageway. Element 18 also has a portion 22 of reduced cross-sectional area positioned in said passageway with its middle part spaced approximately 180° from said slot 19 to balance pressure induced forces exerted across the element thereby tending to avoid or reduce undesirable rocking movement between the casing and the outer sleeve.

As seen in FIG. 4, the coupling parts are retained in operative relation by a plug 32 threaded into the open end of casing 15. For some purposes and under appropriate circumstances, the outer sleeve 12*a* may advantageously be integral with and, in effect, constitute the inner end part of said plug.

It is noted that outer sleeve 12 may be of metal, nylon or other suitable material provided with a longitudinal slot, as 33, FIG. 3, or it may be a continuous constrictable tube in which case it is conveniently mounted coaxially on pipe 10 prior to flaring, beading or otherwise providing the stop, as 11, which is adapted to resist blow-out or disengagement of said pipe from the coupling assembly when the conduit system is operating under high pressure.

A shoulder 30 of inner sleeve 13 retains outer ring 23 in sealing position between said sleeve 13 and the inner end of the cylindrical portion 31 of outer sleeve 12. Where the outer sleeve 12 is longitudinally slotted, as at 33, FIG. 3, a flat annular washer, as 24, is advantageously positioned between seal ring 23 and the inner end face of said cylindrical end portion of sleeve 12 or 12*a*, FIG. 4.

As seen in FIGS. 1 and 4, the outer or pipe gripping sleeve, as 12, 12*a*, is formed with a truncated conical or tapered portion 28 and an axially inwardly facing radially disposed stop conveniently in the form of a peripheral annular shoulder 25. The axially outer end portion of inner sleeve 13 includes a truncated conical zone 26 advantageously positioned in a tapered bore portion 27 of the casing and closely embracing said tapered portion 28 of outer sleeve 12, 12*a*. The outer end of inner sleeve 13 also includes a terminal cylindrical portion 29. As seen in FIG. 1, the axially outer end edge thereof is normally spaced from shoulder 25 to permit outward axial extension of said sleeve 13 under increasing internal pressure. Such pressure and extension develop a camming effect of sleeve 13 on sleeve 12, thus increasing constriction of said sleeve 12 around pipe 10 which under some conditions, if permitted to become excessive could produce deformation or collapse thereof. To avoid this result, such undesired or excessive endwise extension of inner sleeve 13 is stopped when the outer end thereof seats against shoulder 25, FIG. 2, and thus averts possible damage to the coupling parts. Also, even relatively slight deformation of pipe 10 adjacent to seal 23 could produce leakage at that location.

Assuming that the parts are assembled as described, it is noted that pressure induced axial extension outwardly of inner sleeve 13 and especially the frusto-conical portion 26 thereof produces a camming effect on the tapered portion of sleeve 12 and hence a construction thereof on pipe 10 until optimum gripping or damping effect is attained whereupon shoulder 25 prevents further extension of sleeve 13 and hence further constriction of sleeve 12 on pipe 10. Moreover, the structure as described provides a coupling which can be readily assembled and as easily disassembled on the job while providing optimum leak resistance and coupling security under extreme operating conditions. Said coupling is also advantageously incorporated in fluid systems normally operating at relatively low pressure as well as those on high pressure. Thus, when sudden acceleration of pressure or surging occurs in a normally low pressure system, a shock impulse is produced which may amplify the system pressure enough to effect violent axial displacement of the pipe outwardly or in the direction to disengage it from the casing. However, this undesirable effect is avoided in use of the above described coupling independently of temperature changes, said endwise extension of the pipe being promptly damped or arrested by the resultant rapidly increased constriction or clamping of the outer sleeve thereon and by the positive stop supplied by shoulder 25, as in the case of normally high pressure systems.

Conduit installations requiring adequate and dependable couplings also commonly involve, when using known types of couplings, substantial and sometimes prohibitive costs in manufacture, assembly and maintenance. Embodiments of my invention, however, as above described, provide important economies in that they can be fabricated from appropriate but relatively low cost materials; can be installed at reduced labor costs; and are readily disassembled and reassembled for parts repair and replacement. As to production cost, the same kinds of materials can in many cases be employed effectively in standard forms and sizes for both high and low pressure systems; and only minimal hand work on the pipe end is ordinarily required to complete the coupling assembly.

What is claimed is:

1. A coupling assembly for fluid conduit systems of the type including a generally cylindrical pipe having adjacent to one end portion radially extending peripheral stop means, a radially flexible axially outer sleeve mounted co-axially on said pipe and being deformable radially into gripping engagement therewith, an axially inner sleeve mounted co-axially on said end portion of the pipe, a casing mounted co-axially on said end portion and enclosing said sleeves, sealing ring means operatively engaged with said inner sleeve and operatively interposed between said pipe and said casing, said coupling assembly being characterized in that said outer sleeve has a frusto-conical portion and said inner sleeve has a frusto-conical portion positioned to operatively engage said frusto-conical portion of the outer sleeve and is movable axially in relation thereto, said components of the coupling assembly being so arranged and related that, in operative assembled condition, the casing and the outer sleeve remain in substantially fixed relative positions; and with increasing pressure in the pipe said inner sleeve is extendable axially in a direction to exert camming action on the frusto-conical portion of said outer sleeve to increase the constrictive effect and restraining grip thereof on the pipe; and said casing and said outer sleeve have opposed annular channels which provide a passageway between them and are retained in operative relation by a flexible locking element removably positioned in said passageway, said element having its ends substantially in abutting relation and said casing having an opening into said passageway for insertion and removal of said locking element, and an intermediate portion of said element being of relatively smaller cross sectional area than that of its end portions and of the passageway, said intermediate portion, in operation, being disposed in said passageway with its center approximately 180° from said opening in the casing.

2. A coupling assembly for fluid conduit systems of the type including a generally cylindrical pipe having adjacent to one end portion radially extending peripheral stop means, a radially flexible axially outer sleeve mounted co-axially on said pipe and being deformable radially into gripping engagement therewith, an axially inner sleeve mounted co-axially on said end portion of the pipe, a casing mounted co-axially on said end portion and enclosing said sleeves, sealing ring means operatively engaged with said inner sleeve and operatively interposed between said pipe and said casing, said coupling assembly being characterized in that said outer sleeve has a frusto-conical portion and said inner sleeve has a frusto-conical portion positioned to operatively engage said frusto-conical portion of the outer sleeve and is movable axially in relation thereto, said components of the coupling assembly being so arranged and related that, in operative assembled condition, the casing and the outer sleeve remain in substantially fixed relative positions; and with increasing pressure in the pipe said inner sleeve is extendable axially in a direction to exert camming action on the frusto-conical portion of said outer sleeve to increase the constrictive effect and restraining grip thereof on the pipe; and said outer sleeve includes a radially arranged peripheral shoulder disposed in a plane substantially normal to the sleeve axis; and said inner sleeve is arranged in the casing with an axially outer end face portion thereof positioned to be intercepted by said shoulder to limit the extent of the internal pressure induced outward displacement of said inner sleeve, thereby to arrest increase in the constrictive gripping effect of said outer sleeve on the pipe.

References Cited

UNITED STATES PATENTS

| | | | |
|---|---|---|---|
| 2,507,261 | 5/1950 | Mercier | 285—34.1 |
| 2,523,135 | 9/1950 | Mercier | 285—342 |
| 2,635,901 | 4/1953 | Osborn | 285—105X |

FOREIGN PATENTS

| | | | |
|---|---|---|---|
| 6,505,123 | 1/1966 | Netherlands | 205—341 |
| 102,022 | 6/1963 | Norway | 285—105 |

DAVE W. AROLA, Primary Examiner

U.S. Cl. X.R.

285—39, 321, 322